United States Patent
Chao

(10) Patent No.: US 10,680,853 B2
(45) Date of Patent: *Jun. 9, 2020

(54) SYSTEM FOR COMBINING WIRELESS SENSOR NETWORKS AND METHOD THEREOF

(71) Applicant: AMBIT MICROSYSTEMS (SHANGHAI) LTD., Shanghai (CN)

(72) Inventor: Yen-Cheng Chao, New Taipei (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/558,616

(22) Filed: Sep. 3, 2019

(65) Prior Publication Data

US 2019/0394069 A1 Dec. 26, 2019

Related U.S. Application Data

(63) Continuation of application No. 15/919,417, filed on Mar. 13, 2018, now Pat. No. 10,498,555.

(51) Int. Cl.
*H04L 12/66* (2006.01)
*H04L 12/715* (2013.01)
(Continued)

(52) U.S. Cl.
CPC ............ *H04L 12/66* (2013.01); *H04L 45/04* (2013.01); *H04L 61/106* (2013.01); *H04L 41/12* (2013.01);
(Continued)

(58) Field of Classification Search
CPC ....... H04L 12/66; H04L 61/106; H04L 45/04; H04L 67/12; H04L 45/02; H04L 41/12; H04W 84/18
See application file for complete search history.

(56) References Cited

U.S. PATENT DOCUMENTS 8,179,837 B2  5/2012  Kulkarni et al.
10,498,555 B2 * 12/2019  Chao .................. H04L 12/66
(Continued)

FOREIGN PATENT DOCUMENTS

CN       1708962      12/2005
CN       101765095    6/2010
(Continued)

*Primary Examiner* — Brian T O Connor
(74) *Attorney, Agent, or Firm* — ScienBiziP, P.C.

(57) ABSTRACT

A system for combining wireless sensor networks includes a first sink transmitting a request to combine (RTC) and first routing-information. First nodes propagate data and instructions in a first wireless sensor network. The first nodes broadcast the RTC when the first nodes are boundary nodes. The first routing-information are established based on first transmission paths between the first sink and the first nodes. A second sink receives the RTC and the first routing-information from the first sink. The second sink transmits second routing-information to the first sink. The second routing-information are established based on second transmission paths between the second sink and the second nodes. The second node relays the RTC to the second sink according to a flag in a packet of the RTC. The first wireless sensor network combines with the second wireless sensor network to exchange the first routing-information and the second routing-information.

12 Claims, 9 Drawing Sheets

(51) Int. Cl.
*H04L 29/12* (2006.01)
*H04L 12/751* (2013.01)
*H04W 84/18* (2009.01)
*H04L 12/24* (2006.01)
*H04L 29/08* (2006.01)

(52) U.S. Cl.
CPC .............. *H04L 45/02* (2013.01); *H04L 67/12* (2013.01); *H04W 84/18* (2013.01)

(56) References Cited

U.S. PATENT DOCUMENTS

| | | | |
|---|---|---|---|
| 2007/0140149 A1* | 6/2007 | Gandham | ............... H04L 43/00 370/255 |
| 2009/0141898 A1 | 6/2009 | Huang | |
| 2017/0195218 A1* | 7/2017 | Schrum, Jr. | ............. H04L 45/48 |
| 2018/0041425 A1* | 2/2018 | Zhang | ..................... H04L 45/02 |
| 2018/0049101 A1* | 2/2018 | Dacosta | .................. H04L 49/70 |
| 2018/0332601 A1* | 11/2018 | Kim | .................. H04W 72/1242 |

FOREIGN PATENT DOCUMENTS

| | | |
|---|---|---|
| CN | 105575092 | 5/2016 |
| TW | 200924430 | 6/2009 |
| TW | 201739193 | 11/2017 |

* cited by examiner

SYSTEM FOR COMBINING WIRELESS SENSOR NETWORKS AND METHOD THEREOF

CROSS REFERENCE TO RELATED APPLICATIONS

This application is a Continuation of pending U.S. patent application Ser. No. 15/919,417, filed on Mar. 13, 2018 and entitled "SYSTEM FOR COMBINING WIRELESS SENSOR NETWORKS AND METHOD THEREOF", the entirety content of which is incorporated by reference herein.

FIELD

The disclosure relates to a system and method for combining and establishing a secure channel for a distributed wireless sensor network, especially a distributed system capable of dynamically exchanging routing-information to extend the transmission range of a wireless sensor network.

BACKGROUND

A wireless sensor network (WSN) is a network system to which one or more sink and sensor nodes contribute. The sink and the sensor nodes communicate wirelessly. The WSN transmits sensor data at low power using multiple hops and dynamic transmission paths, and supports a variety of network topologies.

The transmission range of the WSN is limited by the distribution of the sensor nodes. A single WSN is not flexible in its transmission range. The user needs to set more sensor nodes when they want to extend the transmission range. Different WSNs in the same environment cannot at present communicate with each other

SUMMARY

In the disclosure, a first sink and a second sink exchange first routing-information of a first WSN and second routing-information of a second WSN according to a request to combine (RTC). The first WSN and the second WSN communicate with each other by exchanging the first routing-information and the second routing-information. The limitation of the transmission range in single WSN can be resolved by combining different WSNs.

The disclosure provides a system for combining WSNs, applied to a first WSN and a second WSN. The first WSN comprises the first sink and first nodes. The first sink transmits RTC and the first routing-information. The first nodes relay data and instructions in the first WSN. The first nodes broadcast the RTC when the first nodes are boundary nodes. The first routing-information are established based on the first transmission paths between the first sink and the first nodes. The second WSN comprises the second sink and second nodes. The second sink receives RTC and the first routing-information from the first sink according to the RTC. The second nodes relay the data and instructions in the second WSN. The second routing-information are established based on the second transmission paths between the second sink and the second nodes. The second nodes receive RTC and determine whether or not to relay the RTC to the second sink, according to a flag of the RTC. The first sink and the second sink communicate with each other according to the first routing-information and the second routing-information.

The disclosure provides a method of combining WSNs. First routing-information are obtained by first transmission paths between a first sink and first nodes. Second routing-information are obtained by second transmission paths between a second sink and second nodes. An RTC is transmitted by the first sink. Data and instructions are relayed in the first WSN by the first sink. The RTC is broadcast by boundary nodes in the first WSN. The RTC is received by the second nodes. A flag in the RTC determines whether or not it should be relayed to the second sink by the second nodes. The second routing-information are transmitted to the first sink when the RTC is received by the second sink. The first routing-information are transmitted to the second sink by the first sink. The first sink and the second sink communicate with each other according to the first routing-information and the second routing-information.

BRIEF DESCRIPTION OF THE DRAWINGS

Implementations of the present disclosure will now be described, by way of example only, with reference to the attached figures, wherein.

DETAILED DESCRIPTION

Figure 1:
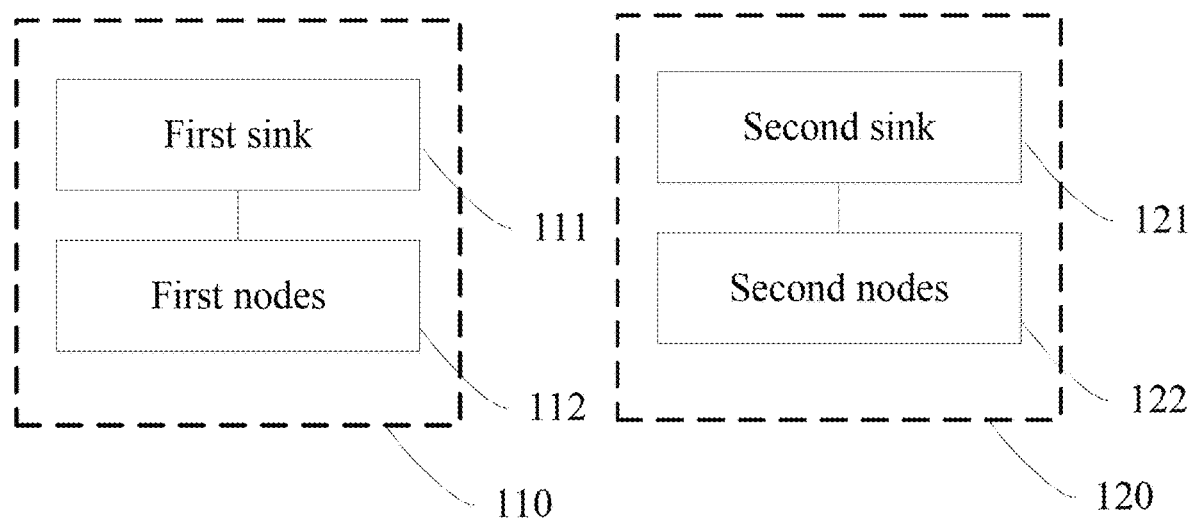
FIG. 1 illustrates a block diagram of a system for combining wireless sensor networks according to an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. The term "comprising," when utilized, is "including, but not necessarily limited to"; it specifically indicates open-ended inclusion or membership in the so-described combination, group, series, and the like. References to "an" or "one" exemplary embodiment in this disclosure are not necessarily to the same exemplary embodiment, and such references mean "at least one".

FIG. 1 illustrates a block diagram of a system for combining wireless sensor networks (hereinafter "the system") according to an exemplary embodiment of the present disclosure. As shown in FIG. 1, the system comprises a first wireless sensor network 110 and a second wireless sensor network 120. The first wireless sensor network 110 comprises a first sink 111 and a plurality of first nodes 112. First routing-information are established according to first transmission paths between the first sink 111 and the first nodes 112. A request to combine (RTC) and the first routing-information are transmitted by the first sink 111. The first nodes 112 relay data and instructions in the first wireless sensor network 110, and the first nodes 112 broadcast the RTC when the first nodes 112 are boundary nodes. The second wireless sensor network 120 comprises a second sink 121 and a plurality of second nodes 122. Second routing-information are established according to second transmission paths between the second sink 121 and the second nodes 122. The second sink 121 receives the RTC. The second sink 121 receives the first routing-information from the first sink 111 according to the RTC. The second nodes 122 relay the data and instructions in the second wireless sensor network 120. The second nodes 122 receive the RTC and determine whether or not to relay the RTC to the second sink according to a flag of the RTC. The flag indicates instructions and types of instructions. The types of the instructions comprise instruction from the same wireless sensor network, instruction from different wireless sensor networks, and the instruction of the RTC.

Figure 2:
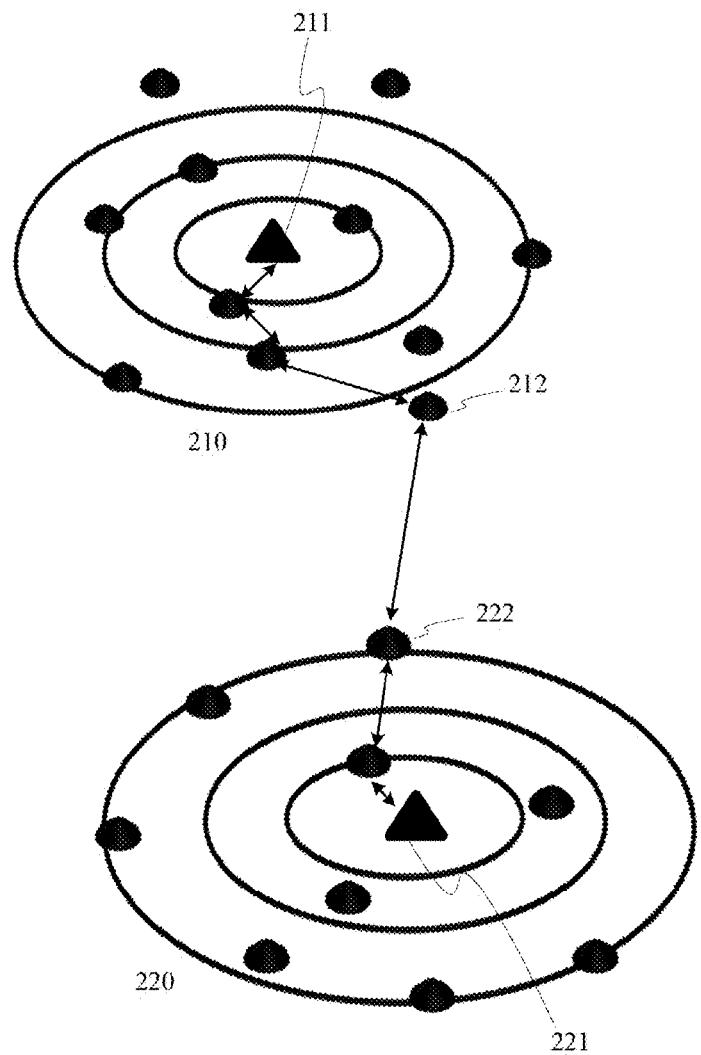
FIG. 2 illustrates the system of FIG. 1 according to an exemplary embodiment of the present disclosure.

FIG. 2 illustrates the system of FIG. 1 according to an exemplary embodiment of the present disclosure. In FIG. 2, the system comprises a first wireless sensor network 210, a first sink 211, a plurality of first nodes 212, a second wireless sensor network 220, a second sink 221, and a plurality of second nodes 222. The first wireless sensor network 210 comprises the first sink 211 and the first nodes 212. The second wireless sensor network 220 comprises the second sink 221 and the second nodes 222. The first nodes 212 collect sensor data in the first sensor network 210, and transmit the sensor data to the first sink 211. The second nodes 222 collect sensor data in the second sensor network 220, and transmit the sensor data to the second sink 221. The first sink 211 and the second sink 221 belong to different wireless sensor networks. The first sink 211 transmits the RTC for discovering wireless sensor network which can be combined. The first nodes 212 relay the RTC to a next node when the first nodes 212 are not the boundary nodes in the first wireless sensor network 210. The first nodes 212 broadcast the RTC when the first nodes 212 are boundary nodes. The second nodes 222 relay the RTC to the second sink 221 according to the routing-information of the second nodes 222. The second sink 221 transmits response to RTC and the second routing-information to the first sink 211 according to the original transmitting path when the first sink 211 and the second sink 221 are not connected to internet. The first sink 211 transmits the first routing-information to the second sink 221 according to the second routing-information after receiving the RTC and the second routing-information. The first wireless sensor network 210 and the second wireless sensor network 220 communicate with each other by exchanging the first routing-information and the second routing-information. The first sink 211 communicates with the second sink 221 according to the first routing-information and the second routing-information.

Figure 3:
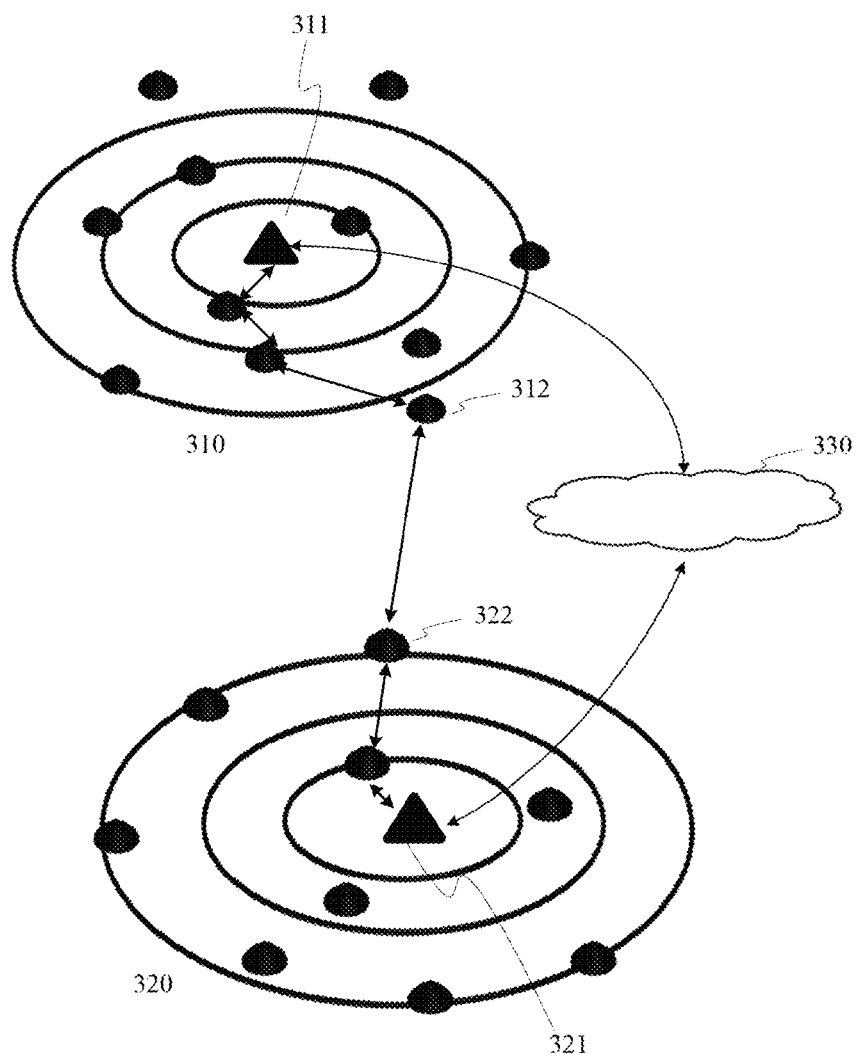
FIG. 3 illustrates communication between sinks by internet in the system of FIG. 1 according to the exemplary embodiment of the present disclosure.

FIG. 3 illustrates communication between sinks by internet in the system of FIG. 1 according to the exemplary embodiment of the present disclosure. As shown in FIG. 3, the system comprises a first wireless sensor network 310, a first sink 311, a plurality of first nodes 312, a second wireless network 320, a second sink 321, and a plurality of second nodes 322. The first wireless sensor network 310 comprises the first sink 311 and the first nodes 312. The second wireless sensor network 320 comprises the second sink 321 and second nodes 322. The first nodes 312 collect sensor data in the first wireless sensor network 310 and transmit the sensor data to the first sink 311. The second nodes 322 collect sensor data in the second wireless sensor network 320 and transmit the sensor data to the second sink 321. The first sink 311 and the second sink 321 belong to different wireless sensor networks. The first sink 311 transmits a RTC for discovering other wireless sensor networks. The first nodes 312 relay the RTC to next node when the first nodes 312 are not the boundary node in the first wireless sensor network 310. The first nodes 312 broadcast the RTC when the first nodes 312 are boundary nodes. The second nodes 322 relay the RTC to the second sink 321 according to the routing-information of the second nodes 322. The second sink 321 transmits a response to RTC and second routing-information to the first sink 311 according to the internet 330 when the first sink 311 and the second sink 321 are connected to the internet 330. After receiving the response to RTC and the second routing-information, the first sink 311 transmits a first routing-information to the second sink 321 according to the internet 330. The first wireless sensor network 310 and the second wireless sensor network 320 communicate with each other by exchanging the first routing-information and the second routing-information. The first sink 311 communicates with the second sink 321 according to the first routing-information and the second routing-information.

Figure 4:
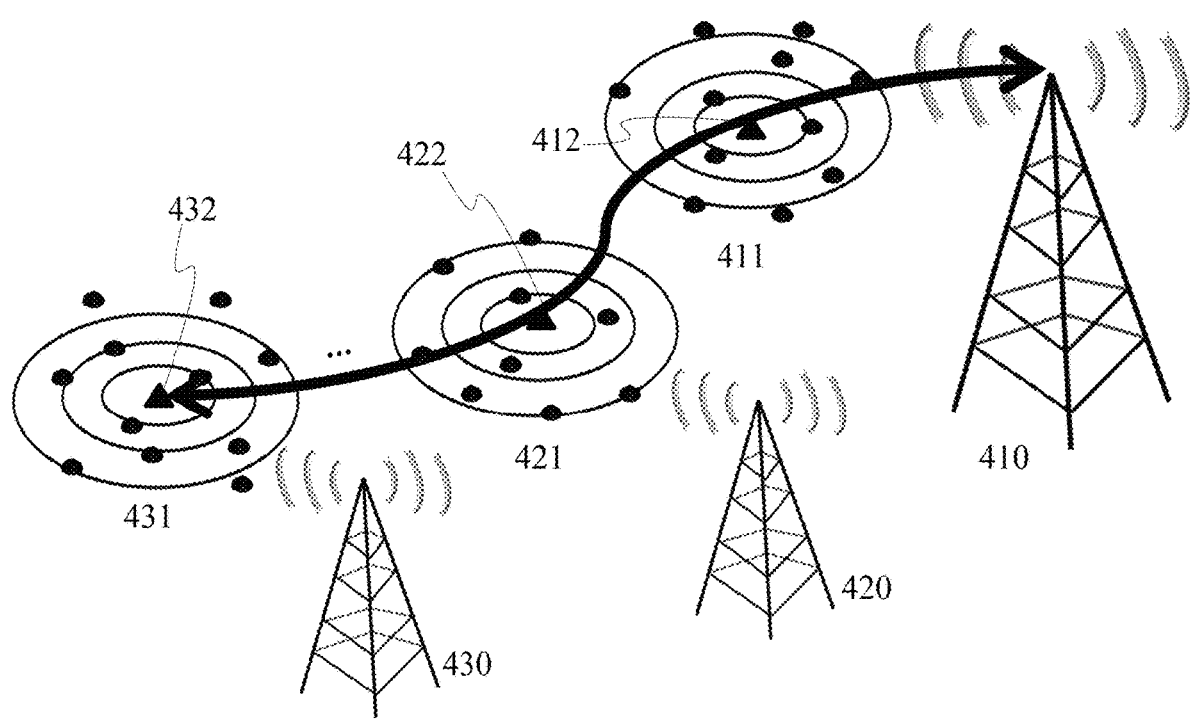
FIG. 4 illustrates the system of FIG. 1 according to another exemplary embodiment of the present disclosure.

FIG. 4 illustrates the system of FIG. 1 according to another exemplary embodiment of the present disclosure. As shown in FIG. 4, the system comprises a first base station 410, a first wireless sensor network 411, a second base station 420, a second wireless sensor network 421 a third base station 430, and a third wireless sensor network 431. The first base station 410 collects sensor data of the first sensor network 411 from a first sink 412. The limited communication range of the first base station 410 allows the first base station 410 to only connect to the first sink 412 with wireless network. In the conventional method, a second base station and a third base station are built when user equipment want to receive sensor data from a second sink 422 and a third sink 432. The method of present disclosure allows the first sink 412 to transmit a RTC to get second routing-information of the second wireless network 421 and third routing-information of the third wireless sensor network 431. The first sink 412 communicates with the second wireless sensor network 421 according to the second routing-information. The first sink 412 communicates with the third wireless sensor network 431 according to the third routing-information. The first base station 410 communicates with the third wireless sensor network 431 through the first wireless sensor network 411 and the second wireless sensor network 421 as combination paths when the first base station 410 wants to get the third sensor data of the third wireless sensor network 431. The second wireless sensor network 421 comprises the second base station 420. The second base station 420 connects to the second sink 422 wirelessly (wireless devices not shown in FIG. 4). The second sink 422 communicates with the first wireless sensor network 411 according to the first routing-information. The first base station 410 communicates with the second base station 420 by combining the first wireless sensor network 411 and the second wireless sensor network 421.

Figure 5:
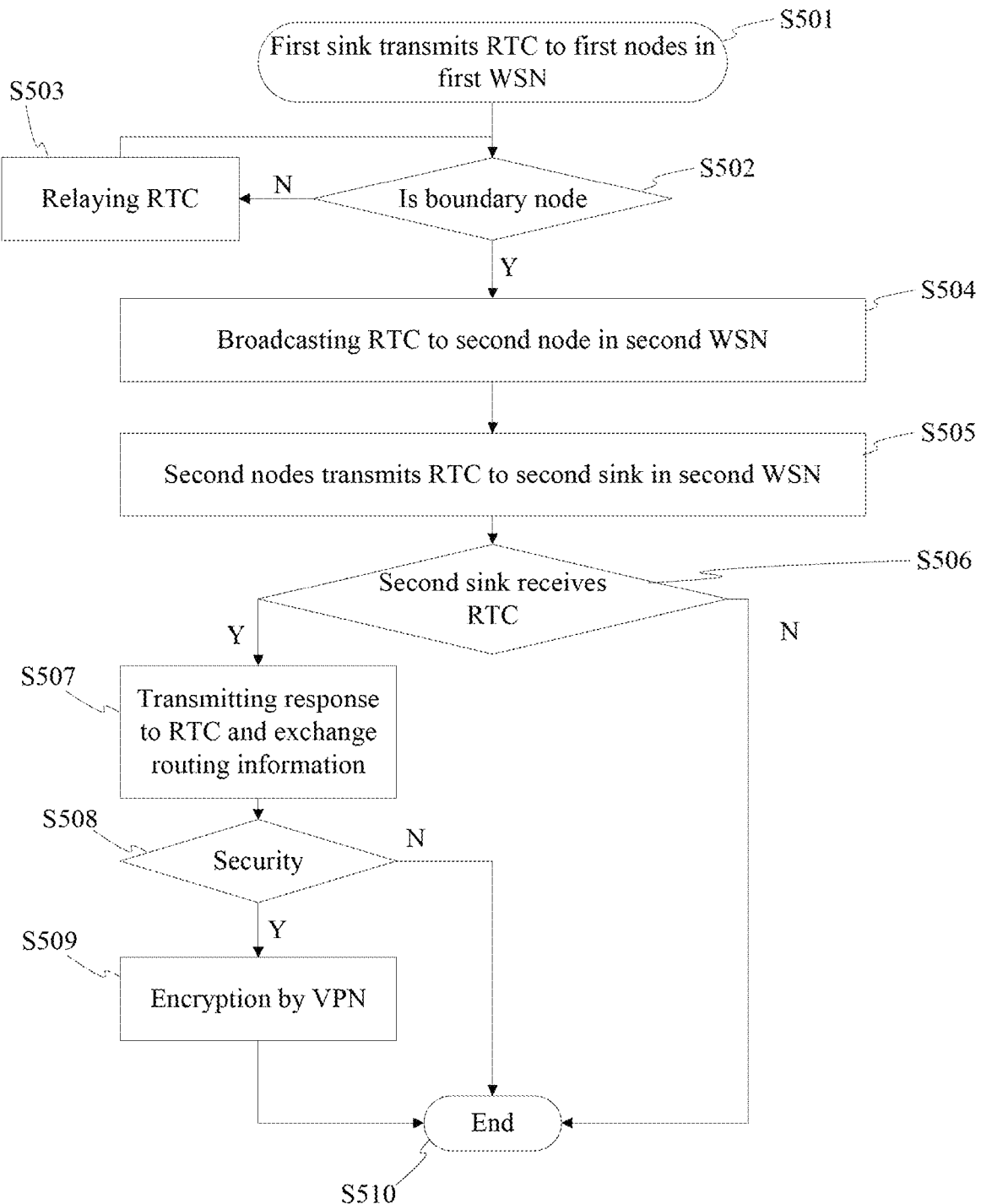
FIG. 5 illustrates a flowchart of a method for the system of FIG. 1 according to exemplary embodiment of the present disclosure.

FIG. 5 illustrates a flow chart of a method for the system of FIG. 1 according to exemplary embodiment of the present disclosure. As shown in FIG. 5, a first sink transmits a RTC to first nodes in a first wireless sensor network (S501). The first nodes relay data and instructions according to first routing-information. The first nodes may be boundary nodes or non-boundary nodes (S502). The first nodes relay the RTC to the next node when the first nodes are non-boundary nodes (S503). The first nodes broadcast the RTC to the second wireless sensor network when the first nodes are boundary nodes (S504). The second nodes receive the RTC and determine whether or not to relay the RTC to the second sink according to a flag of the RTC (S505). The second sink determines whether or not to receive the RTC according to the flag (S506). The process is terminated when the second sink does not receive the RTC (S510). The second sink transmits response to RTC to the first sink and exchanges the first routing information and the second routing information to the first sink (S507). The second sink determines that the response to RTC should be transmitted with security mode or with non-security mode according to information of a packet. The information of the packet includes a flag of security mode which can be set by user (S508). The second sink encryption can be by virtual private network (VPN) under the security mode (S509). The combining process is terminated after the second sink receives routing information from other wireless sensor network (S510).

Figure 6:
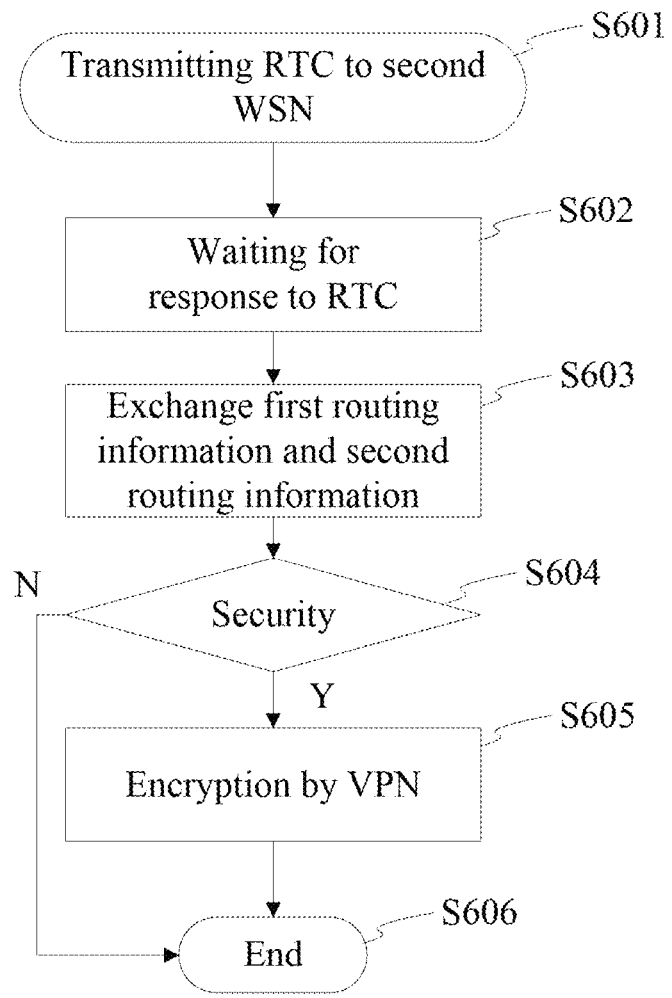
FIG. 6 is a flow chart illustrating a request to combine (RTC) which is transmitted by sink according to exemplary embodiment of the present disclosure.

FIG. 6 illustrates in the flow chart an RTC, which is transmitted by sink according to exemplary embodiment of the present disclosure. As shown in FIG. 6, a first sink transmits a RTC for discovering a second wireless sensor network (S601). The first sink waits to receive a response to RTC and second routing information after a second sink receives the RTC (S602). The first sink transmits first routing-information to the second sink after receiving the response to RTC and the second routing-information. The first sink and the second sink exchange the first routing-information and the second routing-information (S603). The first sink determines that the first routing-information to be transmitted in secure or non-secure mode according to information of the packet. The information of the packet includes the flag of security mode, which can be set by user (S604). The first sink encryption can be by VPN under the security mode (S605). The combining process is terminated after exchanging the first routing-information and the second routing-information (S606).

Figure 7:
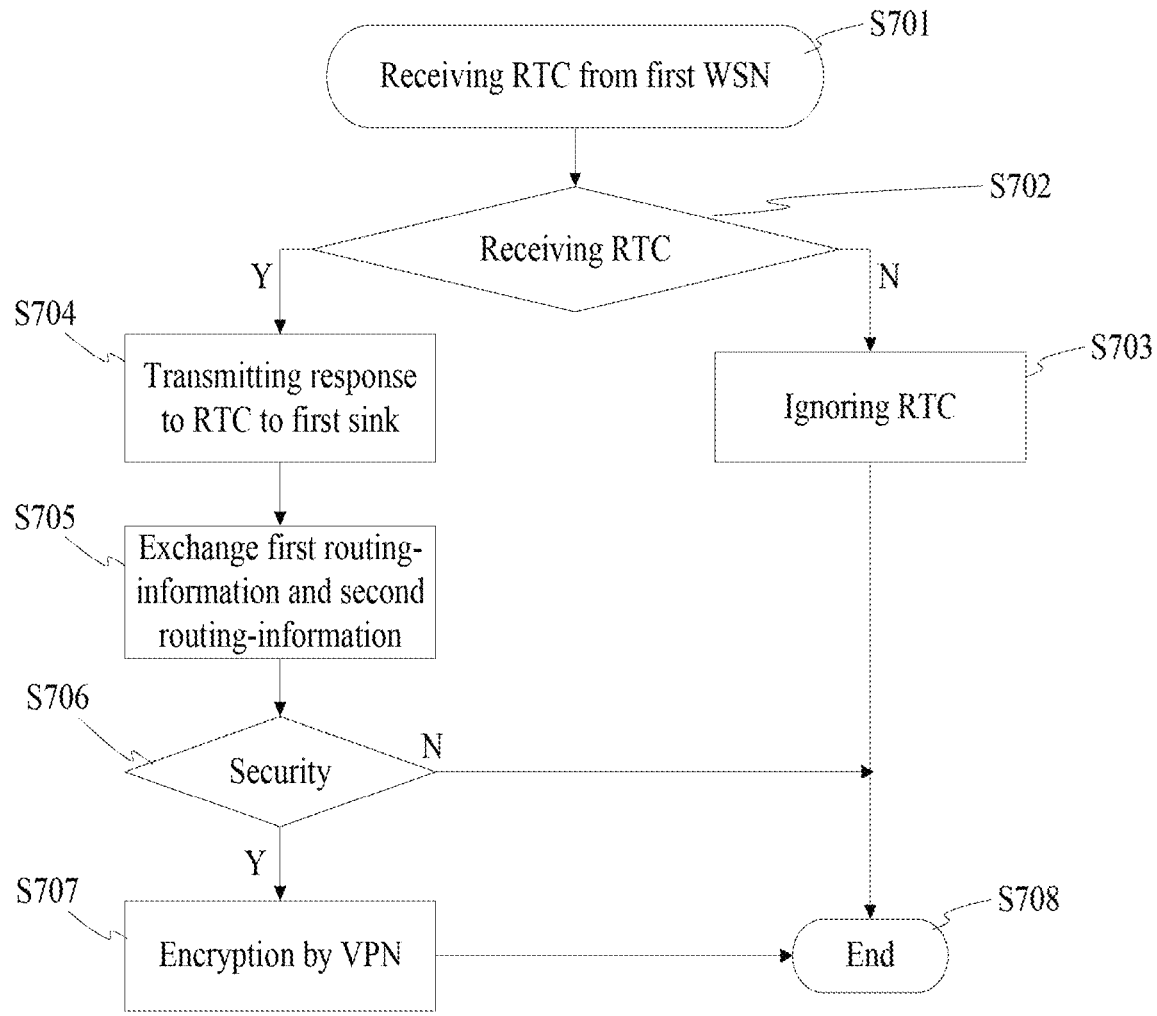
FIG. 7 is a flow chart illustrating a response to a RTC transmitted by sink according to exemplary embodiment of the present disclosure.

FIG. 7 illustrates in the flow chart a response to an RTC transmitted by sink according to exemplary embodiment of the present disclosure. As shown in FIG. 7, a second sink receives a RTC from a first wireless sensor network (S701). The second sink determines that the RTC be received or not received according to a flag of the RTC (S702). The RTC is ignored when the RTC is not to be accepted (S703). The second sink transmits the response to RTC and second routing-information to a first sink when the RTC is accepted (S704). The first sink and the second sink exchange the first routing-information and the second routing-information (S705). The second sink determines that the response to RTC and the second routing-information be transmitted in secure or non-secure mode according to information of the packet. The information of the packet includes the flag of security mode which can be set by user (S706). The second sink encryption can be by VPN under the security mode (S707). The combining process is terminated after exchanging the first routing-information and the second routing-information (S708).

Figure 8:
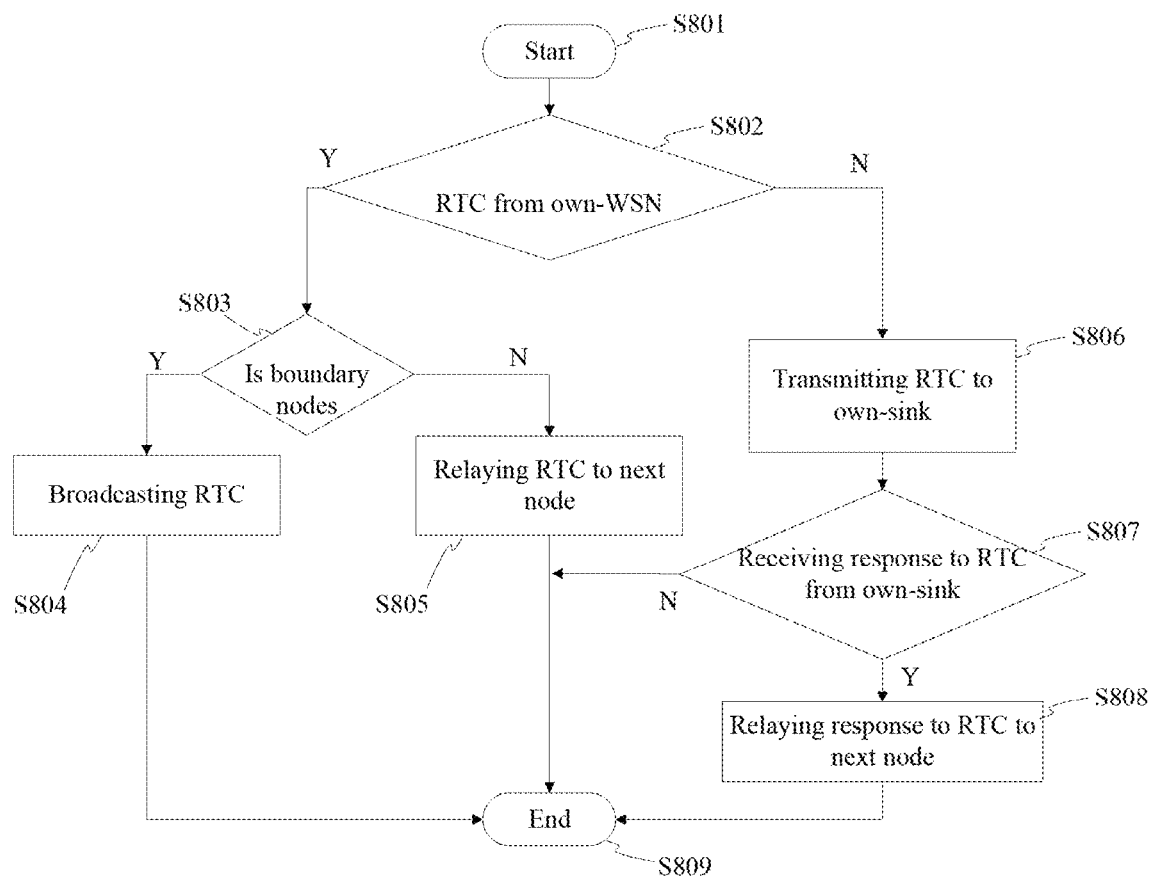
FIG. 8 is a flow chart illustrating a RTC which is received by nodes according to exemplary embodiment of the present disclosure.

FIG. 8 illustrates in the flow chart the RTC received by nodes according to an exemplary embodiment of the present disclosure. As shown in FIG. 8, the nodes receive a RTC (S801). The nodes determine that the RTC is transmitted from own wireless sensor network or from other wireless sensor networks according to a flag of the RTC (S802). The nodes may be boundary or non-boundary nodes (S803). The RTC is broadcasted when the node is the boundary node (S804). The RTC is relayed to next node when the node is not the non-boundary node. In this way, the broadcast transmittance of too many packets is avoided (S805). The nodes relay the RTC to their own sink when the RTC is transmitted from other wireless sensor network (S806). The sink transmits the response to RTC after receiving the RTC. The nodes wait for receiving the response to RTC from their own sink (S807). The second nodes relay the response to RTC to next node after receiving the response (S808). The process of receiving the RTC is then terminated (S809).

Figure 9:
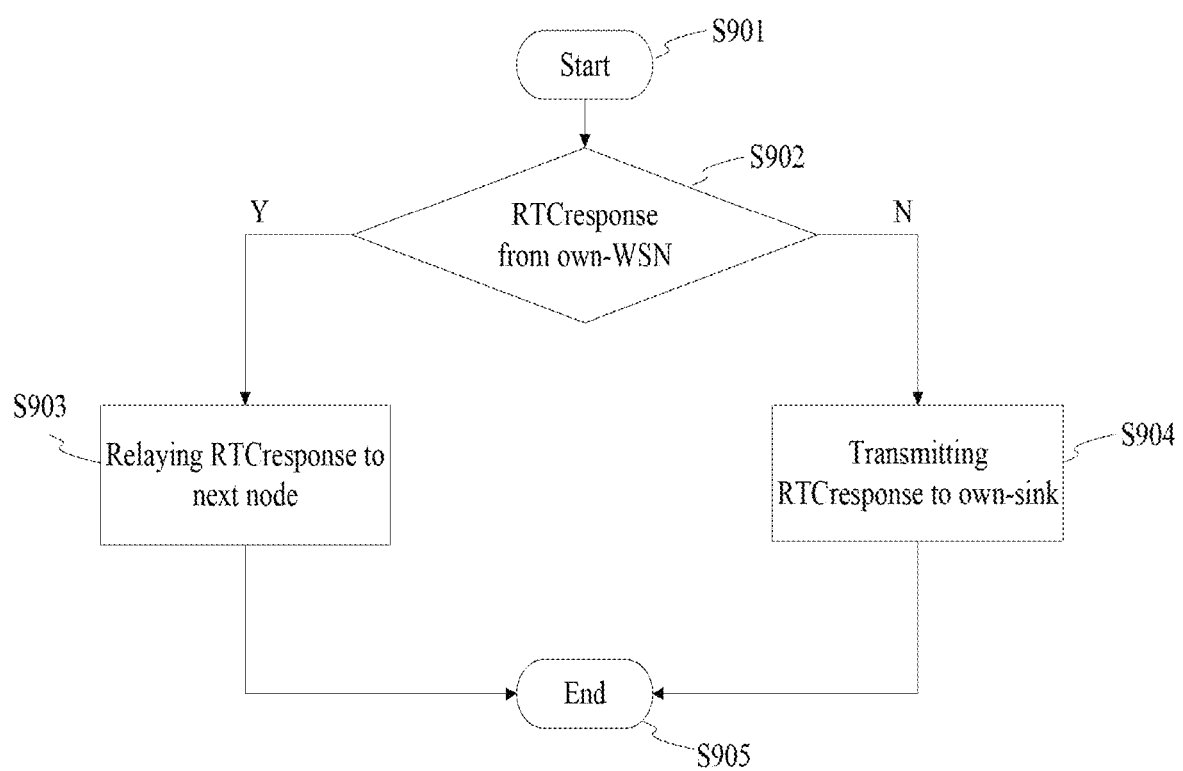
FIG. 9 is a flow chart illustrating a response to a RTC received by nodes according to exemplary embodiment of the present disclosure.

FIG. 9 illustrates a flow chart of the response to RTC (hereinafter "RTCresponse") received by nodes according to exemplary embodiment of the present disclosure. As shown in FIG. 9, the RTCresponse is received by nodes (S901). The nodes determine whether the RTCresponse is transmitted from own wireless sensor network or from other wireless sensor networks according to a flag of the RTCresponse (S902). The RTCresponse is relayed to next node when the RTCresponse is transmitted from own wireless sensor network (S903). The RTCresponse is relayed to own sink when the RTCresponse is transmitted from other wireless sensor network (S904). The process of receiving the RTCresponse is then terminated (S905).

Communication range of a wireless sensor network is limited by the location of data sink and sensing nodes. Sensor data cannot be obtained the communication range is exceeded. Therefore, a plurality of wireless sensor networks can be utilized for covering the wider range of application scenarios. The network packages cannot communicate with each other in different wireless sensor networks. More nodes can be set for extending the transmission range of the wireless sensor network. By this disclosure, the communication range will be extended by exchanging the routing-information in different wireless sensor networks by transmitting the RTC. The transmission of data by the wireless sensor network is not only improved, but the cost of the deployment of the wireless sensor networks is also reduced.

The exemplary embodiments shown and described above are only examples. Therefore, many details of such art are neither shown nor described. Even though numerous characteristics and advantages of the technology have been set forth in the foregoing description, together with details of the structure and function of the disclosure, the disclosure is illustrative only, and changes may be made in the detail, especially in matters of shape, size, and arrangement of the parts within the principles of the disclosure, up to and including the full extent established by the broad general meaning of the terms used in the claims. It will therefore be appreciated that the exemplary embodiments described above may be modified within the scope of the claims.

What is claimed is:

1. A combination system of wireless sensor network, comprising:
    a first wireless sensor network, comprising:
        a first sink transmitting request to combine and first routing-information; and;
        first nodes relaying data and instructions in the first wireless sensor network, the first nodes broadcasting the request to combine, wherein the first routing-information are established based on first transmission paths between the first sink and the first nodes;
    a second wireless sensor network, comprising:
        a second sink receiving the request to combine and obtaining the first routing-information from the first sink according to the request to combine; and
        second nodes relaying the data and instructions in the second wireless sensor network, and wherein second routing-information are established based on second transmission paths between the second sink and the second nodes, wherein the second nodes receive request to combine and determine whether the request to combine be relayed to the second sink according to a flag of the request to combine; and
    the first sink and the second sink communicate with each other according to the first routing-information and the second routing-information.

2. The combination system of wireless sensor network as claimed in claim 1, wherein the flag indicates types of instructions, the types of the instructions comprise instructions from the same wireless sensor network, instructions from different wireless sensor networks and the request to combine.

3. The combination system of wireless sensor network as claimed in claim 1, wherein
    the first sink and the second sink exchange the first routing-information and the second routing-information through internet when the first sink and the second sink are connected to the internet; and
    the first sink and the second sink exchange the first routing-information and the second routing-information by the boundary node when the first sink and the second sink are not connected to the internet.

4. The combination system of wireless sensor network as claimed in claim 1, wherein the first wireless sensor network further comprises a first base station connected to the first sink by wireless communication, and wherein the first sink communicates with the second nodes in the second wireless sensor network according to the second routing-information.

5. The combination system of wireless sensor network as claimed in claim 4, wherein the second wireless sensor network further comprises the second base station connected to the second sink by wireless communication, and wherein the second sink communicates with the first nodes in the first wireless sensor network according to the first routing-information.

6. The combination system of wireless sensor network as claimed in claim 1, wherein the first nodes broadcasting the request to combine only when the first nodes are boundary nodes.

7. A combination method of wireless sensor network, comprising:
    obtaining first routing-information by first transmission paths between a first sink and first nodes;
    obtaining second routing-information by second transmission paths between a second sink and second nodes;
    transmitting a request to combine by the first sink;
    relaying data and instructions in a first wireless sensor network by the first sink;
    broadcasting the request to combine by the first nodes;
    receiving request to combine and determining whether the request to combine be relayed to the second sink by the second nodes according to a flag of the request to combine;
    receiving the request to combine by the second sink and transmitting the second routing-information to the first sink;
    transmitting the first routing-information to the second sink by the first sink; and
    establishing combination paths between the first sink and the second sink according to the first routing-information and the second routing-information.

8. The combination method of wireless sensor network as claimed in claim 7, wherein the flag indicates types of instructions, the types of instructions comprise instructions from the same wireless sensor network, instructions from different wireless sensor networks and the request to combine.

9. The combination method of wireless sensor network as claimed in claim 7, wherein
    the first sink and the second sink exchange the first routing-information and the second routing-information through the internet when the first sink and the second sink are connected to the internet; and
    the first sink and the second sink exchange the first routing-information and the second routing-information by the boundary node when the first sink and the second sink are not connected to the internet.

10. The combination method of wireless sensor network as claimed in claim 7, wherein the first wireless sensor network further comprises a first base station connected to the first sink by wireless communication, and wherein the first sink communicates with the second nodes in the second wireless sensor network according to the second routing-information.

11. The combination method of wireless sensor network as claimed in claim 7, wherein the second wireless sensor network further comprises the second base station connected to the second sink by wireless communication, and wherein the second sink communicates with the first nodes in the first wireless sensor network according to the first routing-information.

12. The combination method of wireless sensor network as claimed in claim 7, wherein broadcasting the request to combine only by boundary nodes in the first wireless sensor network.

* * * * *